J. H. BRINTON.
Horse Hay-Fork.
No. 84,084.
Patented Nov. 17, 1868.
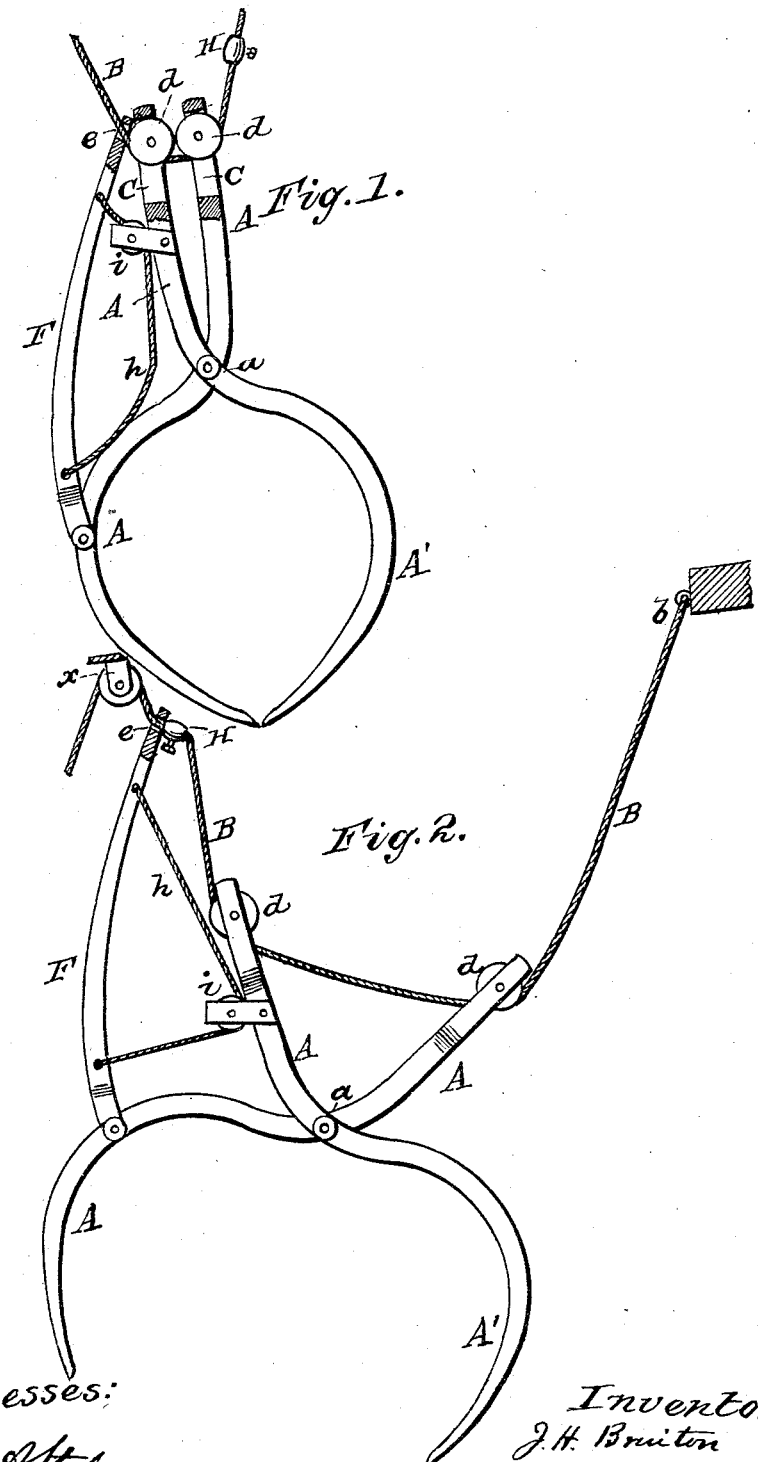

United States Patent Office.

JOSEPH H. BRINTON, OF THORNBURY, PENNSYLVANIA.

Letters Patent No. 84,084, dated November 17, 1868.

IMPROVEMENT IN HORSE HAY-FORKS.

The Schedule referred to in these Letters Patent and making part of the same.

*To all whom it may concern:*

Be it known that I, JOSEPH H. BRINTON, of Thornbury, Chester county, Pennsylvania, have invented an Improved Hay-Elevator; and I do hereby declare the following to be a full, clear, and exact description of the same.

My invention consists, first, in the use of an adjustable ball or enlargement upon the operating-rope of a hay-elevator, for the purpose of automatically unloading the same, as fully described hereafter; and, secondly, of the combination of the adjustable ball or enlargement with certain devices for effecting the instantaneous discharge of the load.

In order to enable others skilled in the art to make and apply my invention, I will now proceed to describe its construction and operation, reference being had to the accompanying drawing, which forms a part of this specification, and in which—

Figure 1 is a side view of my improved hay-elevator, and

Figure 2, the same, as it appears when thrown open discharge a load.

The apparatus consists of two rods or bars of metal, A and A', crossed and jointed at $a$, and so bent at their lower ends as to form curved jaws, between which a mass of hay may be held; while the upper ends of the said bars are straight and nearly parallel when the jaws are closed, as shown in fig. 1.

The apparatus is suspended by a rope, B, which passes through slots $c\ c$, at the upper ends of the bars A and A', and beneath pulleys $d\ d$, arranged to turn in the same, one end of the said rope being secured to some stationary object at $b$, and its opposite end passing over a pulley, $x$, and thence to the point from which the apparatus is to be operated.

The rope passes also through a hole, $e$, in the outer end of an arm, F, which is jointed to the jaw A of the elevator, and connected to the bar A' by a cord, $h$, which passes around a pulley, $i$, attached to the said bar.

The rope B is provided with a knob or ball, H, arranged to slide upon the same, and to be adjusted and secured in any desired position by a set-screw or other fastening, the ball passing readily through the slots $c\ c$ and beneath the pulleys $d\ d$ of the elevator, but being too large to enter the hole $e$ at the outer end of the arm F, as will be hereafter described.

To load the apparatus, the jaws are spread apart, and forced downwards into the hay to be elevated, that portion of the mass contained between them being seized and securely held, when the jaws are closed together in the act of raising the apparatus.

When the mass of hay held between the jaws has been elevated to almost the desired point, the ball H, previously adjusted upon the operating-rope, passes through the slots $c\ c$ of the apparatus, and strikes the arm F, being, as before described, too large to pass through the opening in the same.

The rope is still drawn over the pulley $x$, in the direction of the arrow, fig. 2, and the arm F, against which the ball H bears, is turned back from the apparatus, until the cord $h$, which previously hung loose, is tightened; after which, on continuing the pull upon the operating-rope, the jaw A and upper end of the bar A' will be drawn towards each other, and the centre of gravity of the apparatus suddenly shifted, it then hanging nearly perpendicularly from the pulley $x$, as shown in fig. 2, with the jaws completely opened, and the mass of hay discharged.

By merely readjusting the ball H, the apparatus can be made to discharge at any point, being entirely automatic in its action, and by its use I am enabled to dispense with the usual unloading-devices and operating-cords, which render ordinary hay-elevators complicated and difficult to manage.

I claim as my invention, and desire to secure by Letters Patent—

1. The use of an adjustable ball or other enlargement upon the operating-rope of a hay-elevator, for automatically unloading the same, substantially as herein set forth.

2. The combination of the adjustable ball H with an arm, F, jointed to one of the jaws of a hay-elevator, connected to the other by a cord, $h$, and having an opening, $e$, for the passage of the operating-rope, the whole being constructed, arranged, and operating substantially as and for the purpose described.

In testimony whereof, I have signed my name to this specification in the presence of two subscribing witnesses.

JOSEPH H. BRINTON.

Witnesses:
ADDISON MAY,
WM. WHITEHEAD.